(12) United States Patent
Ito et al.

(10) Patent No.: US 12,024,229 B2
(45) Date of Patent: Jul. 2, 2024

(54) LATERAL SURFACE MEMBER STRUCTURE OF VEHICLE BODY

(71) Applicant: NIPPON STEEL CORPORATION, Tokyo (JP)

(72) Inventors: Yasunori Ito, Tokyo (JP); Yutaka Mikazuki, Tokyo (JP); Mitsuharu Yamagata, Tokyo (JP); Toshiyuki Niwa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 183 days.

(21) Appl. No.: 17/787,796

(22) PCT Filed: Feb. 4, 2021

(86) PCT No.: PCT/JP2021/004085
§ 371 (c)(1),
(2) Date: Jun. 21, 2022

(87) PCT Pub. No.: WO2021/157651
PCT Pub. Date: Aug. 12, 2021

(65) Prior Publication Data
US 2023/0023627 A1 Jan. 26, 2023

(30) Foreign Application Priority Data
Feb. 4, 2020 (JP) .................. 2020-017225

(51) Int. Cl.
*B62D 25/02* (2006.01)
*B62D 21/15* (2006.01)
(Continued)

(52) U.S. Cl.
CPC ......... *B62D 21/157* (2013.01); *B62D 25/025* (2013.01); *B62D 25/2036* (2013.01); *B60K 1/04* (2013.01); *B60K 2001/0438* (2013.01)

(58) Field of Classification Search
CPC .. B62D 25/025; B62D 25/20; B62D 25/2036; B62D 27/023; B62D 21/157; B60K 1/04;
(Continued)

(56) References Cited

U.S. PATENT DOCUMENTS

2013/0088045 A1 4/2013 Charbonneau et al.
2014/0028053 A1 1/2014 Hihara
(Continued)

FOREIGN PATENT DOCUMENTS

CN 207257348 U 4/2018
DE 102013010332 A1 * 6/2014 ............. B62D 25/06
(Continued)

OTHER PUBLICATIONS

DE102013010332 Drawing and Text (Year: 2014).*

*Primary Examiner* — Dennis H Pedder
(74) *Attorney, Agent, or Firm* — Birch, Stewart, Kolasch & Birch, LLP

(57) ABSTRACT

A lateral surface member structure (100) of a vehicle body (1) includes a tubular body (110) extending in a front-rear direction of the vehicle body (1) and an impact absorbing member (120) disposed inside the tubular body (110). The impact absorbing member (120) includes a web (121) extending along the front-rear direction and flat in a vehicle width direction, a vehicle outer flange (122) joined to a vehicle outer end portion of the web (121) and extending along the front-rear direction, and a vehicle inner flange (123) joined to a vehicle inner end portion of the web (121) and extending along the front-rear direction. The vehicle outer flange (122) and the vehicle inner flange (123) each include a rib (122R, 123R) disposed so as to sandwich the web (121) from above and below and extending along the front-rear direction.

16 Claims, 11 Drawing Sheets

(51) Int. Cl.
*B62D 25/20* (2006.01)
*B60K 1/04* (2019.01)

(58) Field of Classification Search
CPC ........ B60K 2001/0438; B60Y 2200/01; B60Y 2410/12; B60Y 2306/01
USPC .......... 296/209, 29, 30, 204, 193.07, 187.12
See application file for complete search history.

(56) References Cited

U.S. PATENT DOCUMENTS

| | | | |
|---|---|---|---|
| 2016/0114667 | A1 | 4/2016 | Ikeda et al. |
| 2018/0148106 | A1* | 5/2018 | Ayukawa ............... B62D 25/20 |
| 2018/0334192 | A1 | 11/2018 | Terada et al. |

FOREIGN PATENT DOCUMENTS

| | | |
|---|---|---|
| EP | 3 683 079 A1 | 7/2020 |
| JP | 2015-3715 A | 1/2015 |
| JP | 2018-90021 A | 6/2018 |
| JP | 2018-192868 A | 12/2018 |
| KR | 97-26737 A | 6/1997 |
| WO | WO 2012/144001 A1 | 10/2012 |

\* cited by examiner (A)

(B)

LATERAL SURFACE MEMBER STRUCTURE OF VEHICLE BODY

TECHNICAL FIELD OF THE INVENTION

The present invention relates to a lateral surface member structure of a vehicle body.

Priority is claimed on Japanese Patent Application No. 2020-017225, filed Feb. 4, 2020, the content of which is incorporated herein by reference.

RELATED ART

In the related art, some of lateral surface member structures of a vehicle body can absorb impacts.

However, the lateral surface member structure of the related art does not meet a demand for protecting a battery pack mounted under a floor of an electrified vehicle from an impact caused by collision of an obstacle from a lateral surface of a vehicle body, and there is room for improvement in suppressing local deformation that affects the battery pack while maintaining impact absorption capacity.

PRIOR ART DOCUMENT

Patent Document

[Patent Document 1] Japanese Unexamined Patent Application, First Publication No. 2018-192868
[Patent Document 2] Japanese Unexamined Patent Application, First Publication No. 2015-003715

DISCLOSURE OF THE INVENTION

Problems to be Solved by the Invention

In view of the above-mentioned problems of the related art, it is an object of the present invention to provide a lateral surface member structure of a vehicle body capable of suppressing local deformation while maintaining an impact absorption capacity.

Means for Solving the Problem

The gist of the present invention is as follows.
(1) According to an aspect of the present invention, there is provided a lateral surface member structure of a vehicle body, including: a tubular body extending in a front-rear direction of the vehicle body; and an impact absorbing member disposed inside the tubular body, in which the impact absorbing member includes a web extending along the front-rear direction and flat in a vehicle width direction, a vehicle outer flange joined to a vehicle outer end portion of the web and extending along the front-rear direction, and a vehicle inner flange joined to a vehicle inner end portion of the web and extending along the front-rear direction, and the vehicle outer flange and the vehicle inner flange include a rib disposed so as to sandwich the web from above and below and extending along the front-rear direction.
(2) In the above (1), the web may be compressed in an up-down direction in a state of being sandwiched from above and below by the rib.
(3) In the above (1) or (2), a sheet thickness of the web may be equal to or less than a sheet thickness of the vehicle outer flange and a sheet thickness of the vehicle inner flange.
(4) In any of the above (1) to (3), the rib and the web are joined to each other.
(5) In any of the above (1) to (4), the web may be a wavy sheet that is repeatedly bent up and down alternately along the front-rear direction.
(6) In any of the above (1) to (4), the web may be a metal porous body.
(7) In any of the above (1) to (4), the web may be formed by arranging a plurality of pipes having a central axis along the vehicle width direction along the front-rear direction.
(8) In the above (7), a first pipe and a second pipe adjacent to each other in the plurality of pipes may be joined to each other.
(9) In any of the above (1) to (8), the tubular body may have a support portion that is supported in the vehicle width direction by an intersecting member which intersects in the vehicle width direction, and a sheet thickness of the vehicle outer flange and a sheet thickness of the vehicle inner flange have different portion in the front-rear direction according to a bending moment distribution generated in a cross section of the tubular body perpendicular to the front-rear direction when a load is applied to a middle portion of the tubular body excluding the support portion in the vehicle width direction.

Effects of the Invention

A lateral surface member structure of a vehicle body of the present invention can suppress local deformation while maintaining the impact absorption capacity.

BRIEF DESCRIPTION OF THE DRAWINGS

FIG. 6(A) is a plan view, and FIG. 6(B) is a side view.

EMBODIMENTS OF THE INVENTION

First Embodiment

Figure 1:
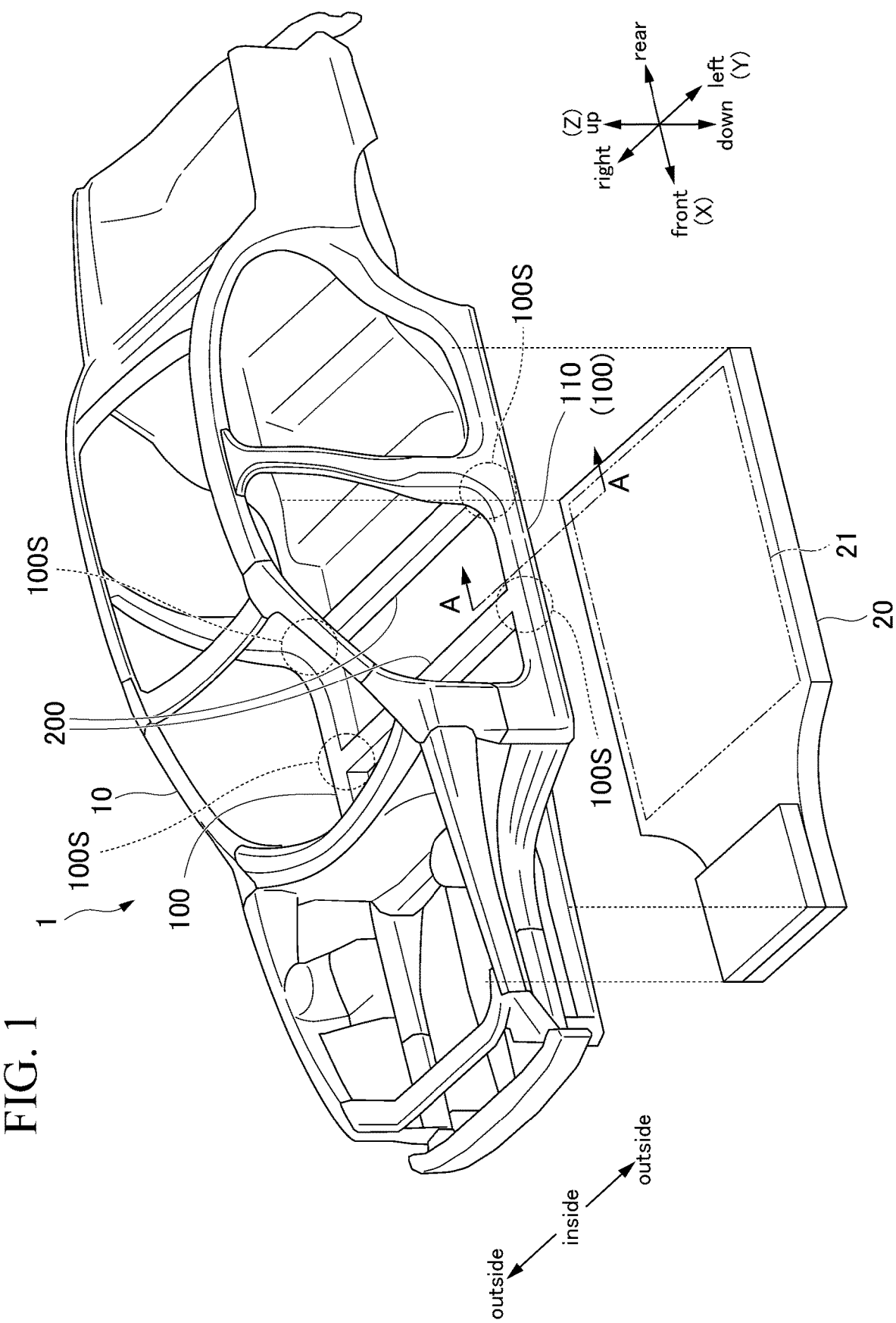
FIG. 1 is an exploded perspective view showing a part of a vehicle body.
Figure 2:
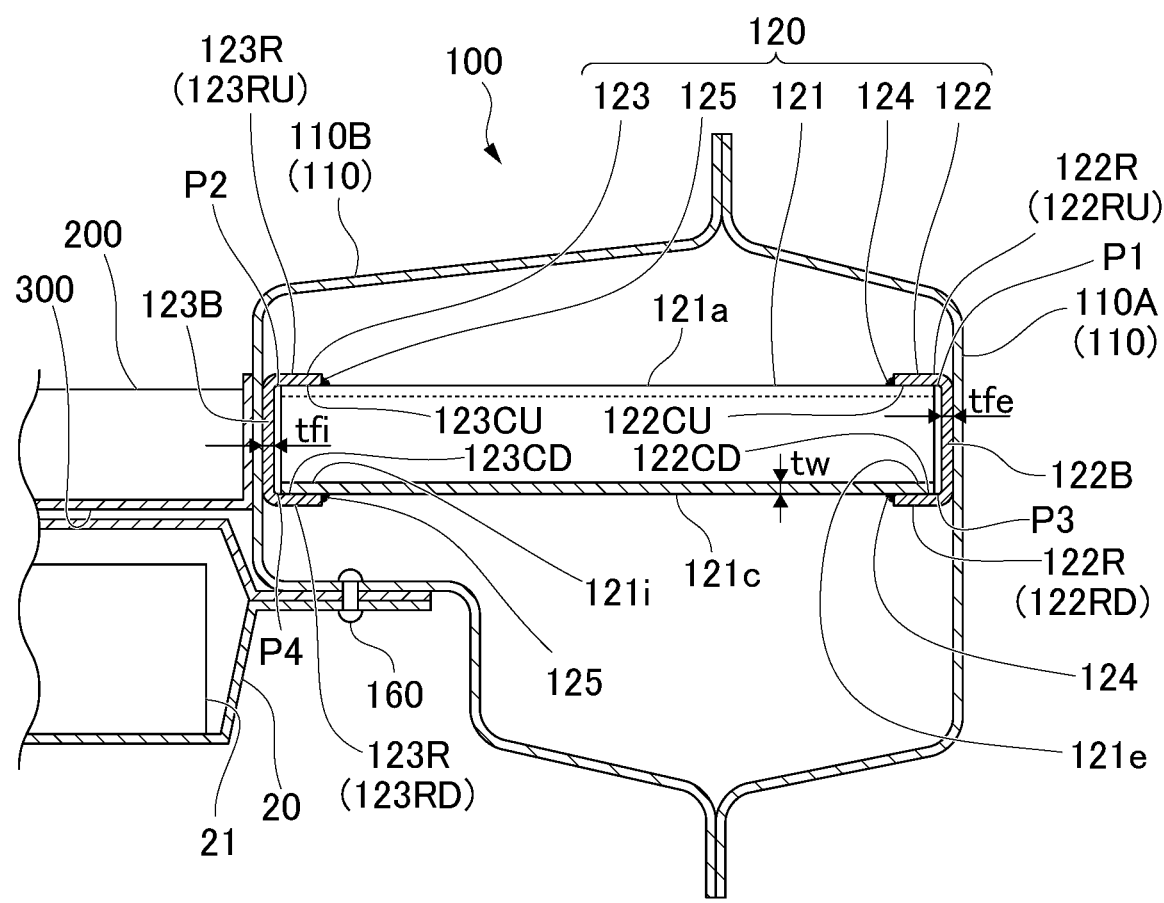
FIG. 2 is a cross-sectional view taken along line A in FIG. 1 showing a lateral surface member structure according to a first embodiment.
Figure 2:
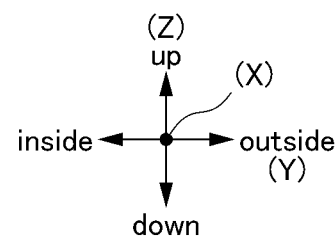

FIG. 1 is an exploded perspective view showing a part of a vehicle body 1 including a lateral surface member structure 100 according to a first embodiment. FIG. 2 is a cross-sectional view taken along line A in FIG. 1, showing the lateral surface member structure 100 according to the first embodiment. FIG. 2 shows a structure in which a battery case 20 and the lateral surface member structure 100 are integrated. Hereinafter, a direction along a traveling direction of a vehicle body (vehicle) may be referred to as a front-rear direction or the X direction, the traveling direction of the vehicle body may be referred to as a front, a side opposite to the front may be referred to as a rear, a direction along a gravity direction may be referred to as an up-down direction or a Z direction, a direction along a horizontal direction may be referred to as a vehicle width direction or a Y direction, a direction away from the center of the vehicle body in the vehicle width direction may be referred to as an outside of the vehicle, and a direction opposite to the outside of the vehicle may be referred to as an inside of the vehicle.

As shown in FIG. 1, the vehicle body 1 includes a frame 10 including the skeleton of the vehicle body 1 and a battery case 20 for accommodating a battery pack 21 such as a lithium ion battery. The vehicle body 1 is driven by a battery as a power source, such as an electric vehicle.

A frame 10 has a lateral surface member structure 100 (also referred to as "side sill") that extends along the front-rear direction of the vehicle body 1 and is located under a door of a lateral opening portion. Further, the frame 10 has an intersecting member 200 that extends along the vehicle width direction of the vehicle body 1 and is bridged between a pair of lateral surface member structures 100.

In the lateral surface member structure 100 of the vehicle body 1 according to the first embodiment, a longitudinal direction of the lateral surface member structure 100 is disposed toward the front-rear direction of the vehicle body 1 on the outside of the vehicle (right side in FIG. 2) from a position where the battery pack 21 is disposed in order to protect a battery pack 21 from a side collision (pole side collision) with a utility pole or the like and protect an occupant.

As shown in FIG. 2, the lateral surface member structure 100 is supported in the vehicle width direction (lateral direction) by the intersecting member 200. The intersecting member 200 supports a floor panel 300. The lateral surface member structure 100 is connected to the battery case 20 via a fastener 160.

In general, the pair of lateral surface member structures 100 is provided on right and left sides of the vehicle body 1 in the vehicle width direction. The lateral surface member structure 100 is supported in the vehicle width direction by the intersecting member 200 in a support portion 100S (refer to FIG. 1). That is, a tubular body 110 of the lateral surface member structure 100 has the support portion 100S that is supported in the vehicle width direction by the intersecting member 200 that intersects the vehicle body 1 in the vehicle width direction. As a result, it is possible to suppress the bending moment around the Z direction that acts on the lateral surface member structure 100 when an obstacle collides with the lateral surface of the lateral surface member structure 100 of the vehicle body 1. Therefore, it is possible to suppress a deformation amount of the lateral surface member structure 100 in the vehicle width direction, particularly inward of the vehicle.

The intersecting member 200 is bridged between the pair of lateral surface member structures 100. In the intersecting member 200, both end portions of the intersecting member 200 are joined to the support portions 100S of the lateral surface member structure 100. A plurality of the intersecting members 200 are appropriately provided.

Structures of the right and left lateral surface member structures 100 in the pair of lateral surface member structures 100 are symmetrical in the vehicle width direction. Hereinafter, the lateral surface member structure 100 on the left side when viewed in the traveling direction will be described as a representative.

Figure 3:
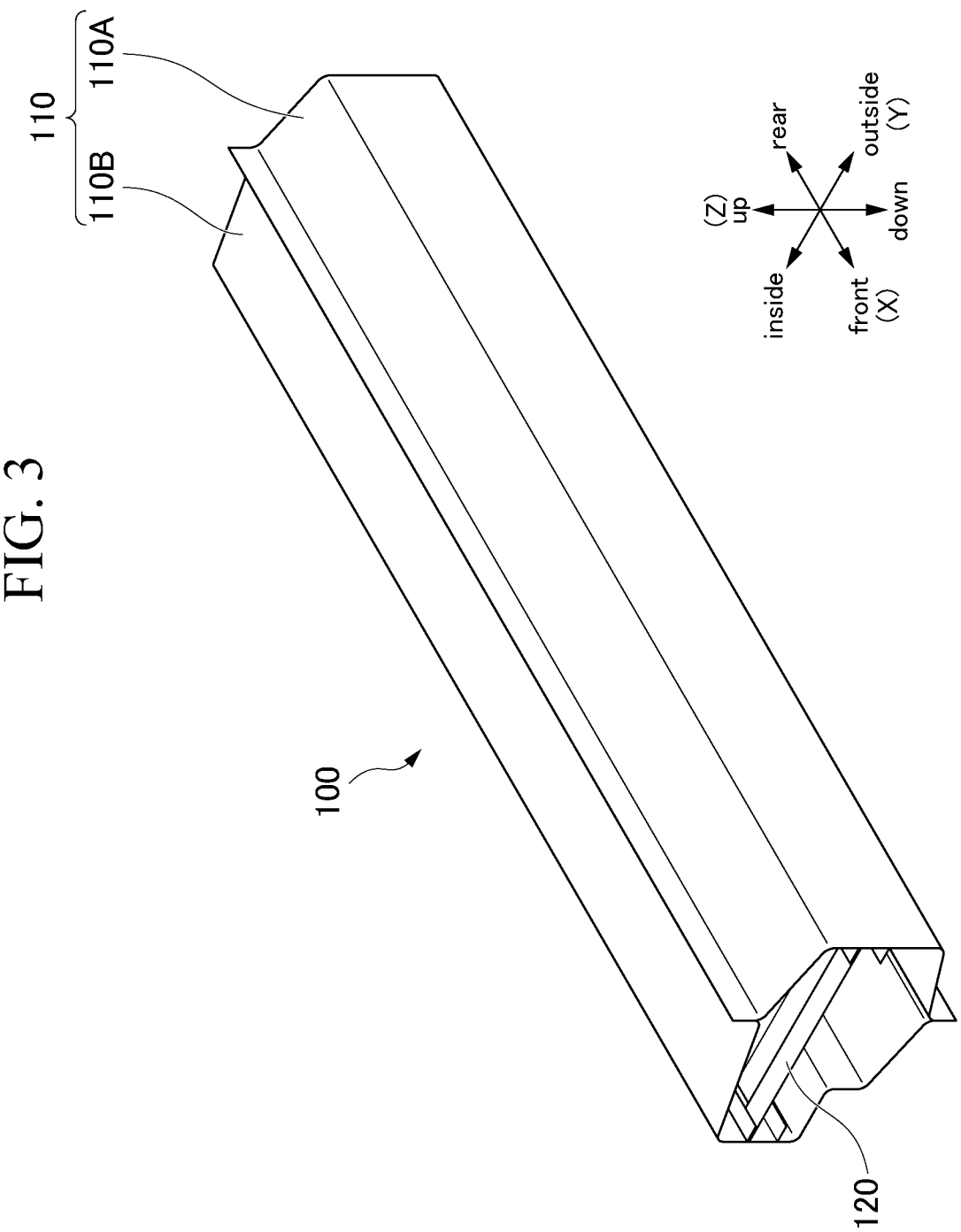
FIG. 3 is a cross-sectional perspective view showing a part of the lateral surface member structure according to the first embodiment.
Figure 4:
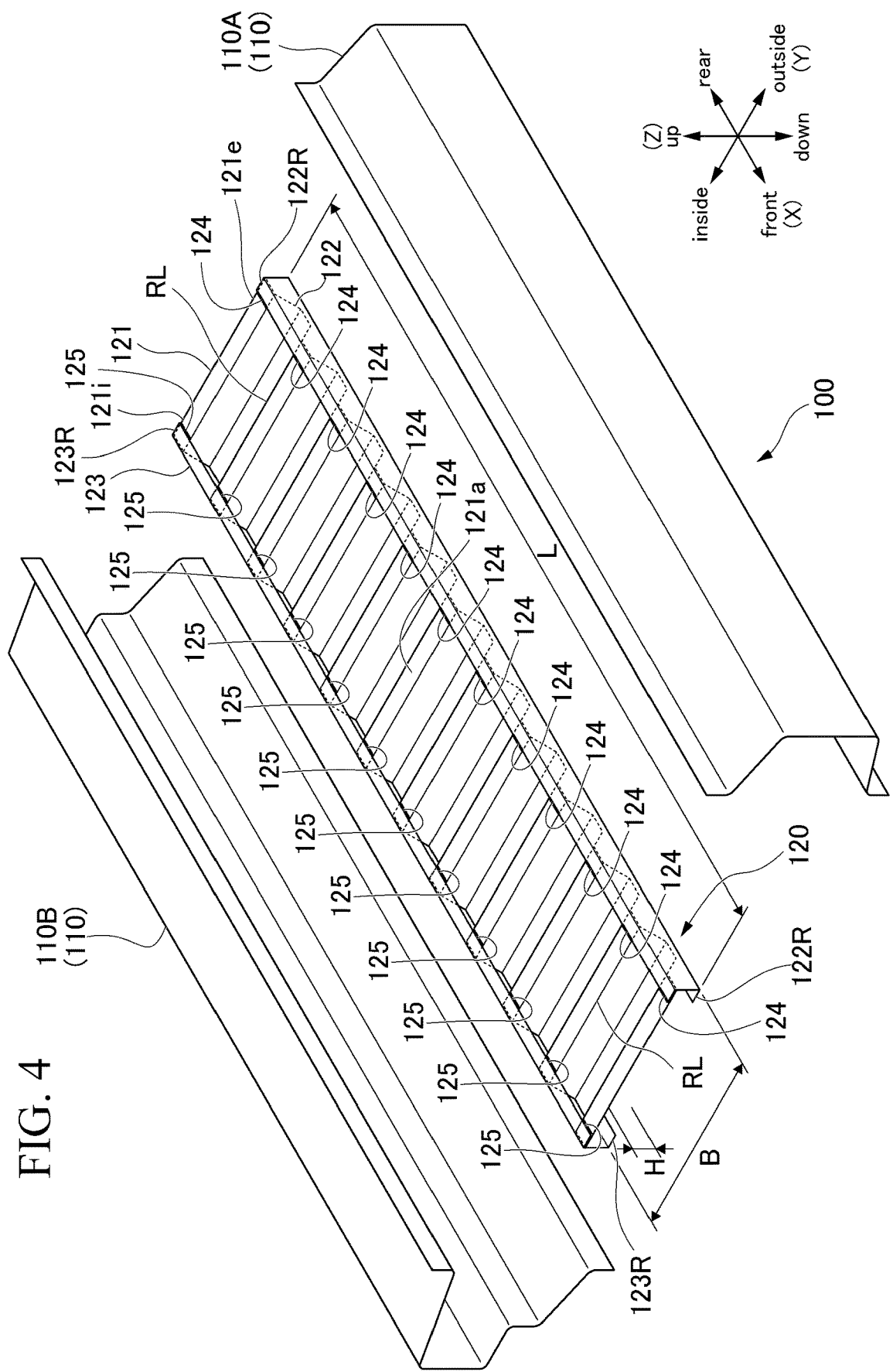
FIG. 4 is an exploded perspective view showing a part of the lateral surface member structure according to the first embodiment.
Figure 5:
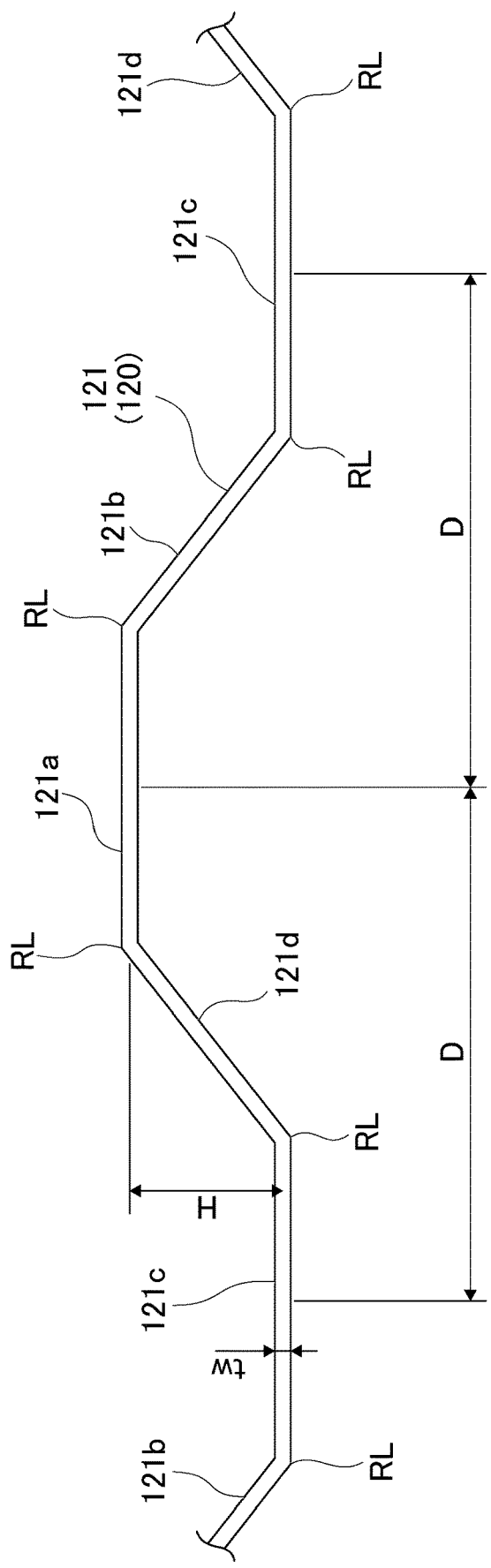
FIG. 5 is a side view showing a part of a web according to the first embodiment.

FIG. 3 is a cross-sectional perspective view showing a part of the lateral surface member structure 100 according to the first embodiment. FIG. 4 is an exploded perspective view showing a part of the lateral surface member structure 100 according to the first embodiment. FIG. 5 is a side view showing a part of a web 121 according to the first embodiment.

As shown in FIGS. 3 to 5, the lateral surface member structure 100 according to the first embodiment has a tubular body 110 (a hollow beam) extending in the front-rear direction of the vehicle body 1 and an impact absorbing member 120 disposed inside the tubular body 110.

(Tubular Body)

The tubular body 110 has a hollow elongated structure. In the tubular body 110, a longitudinal direction of the tubular body 110 is disposed along the front-rear direction of the vehicle body 1. The tubular body 110 is made of, for example, a high strength steel sheet having a tensile strength of 980 MPa, and has desired performance including bending rigidity around the Z direction, buckling proof stress in the vehicle width direction, and the like. The tubular body 110 is divided into two parts, and has a vehicle outer tubular body 110A on the outer side of the vehicle and a vehicle inner tubular body 110B on the inner side of the vehicle. Each of the vehicle outer tubular body 110A and the vehicle inner tubular body 110B has a hat-shaped cross section having flange portions on upper and lower sides. The vehicle outer tubular body 110A and the vehicle inner tubular body 110B are joined by appropriate joining methods such as welding and bolts in a state where the flange portions are butted against each other. The tubular body 110 may not be divided, is not limited to be divided into two parts, and may be divided into three or more parts.

(Impact Absorbing Member)

In the impact absorbing member 120, a longitudinal direction of the impact absorbing member 120 is disposed inside the tubular body 110 along the front-rear direction of the vehicle body 1. The impact absorbing member 120 is made of, for example, a high strength steel sheet. When the impact absorbing member 120 is made of a high strength steel sheet, the impact absorbing member 120 can absorb high energy with a low mass, has high mass efficiency, and is suitable for a vehicle member that requires weight reduction.

The impact absorbing member 120 includes a web 121 extending along the front-rear direction of the vehicle body 1 and flat in the vehicle width direction of the vehicle body 1, a vehicle outer flange 122 joined to a vehicle outer end portion 121e of the web 121 and extending along the front-rear direction, and a vehicle inner flange 123 joined to a vehicle inner end portion 121i of the web 121 and extending along the front-rear direction. The vehicle outer flange 122 and the vehicle inner flange 123 includes ribs 122R and 123R disposed so as to sandwich the web 121 from above and below and extending along the front-rear direction.

Since the impact absorbing member 120 has such a structure, the web 121 is buckled and deformed in the vehicle width direction toward the inside of the vehicle when an impact load is applied. As a result, the web 121 is crushed and deformed while suppressing a peak load (reaction force) generated when the impact load is applied and resisting with an average high load (reaction force), and thus, the web 121 can efficiently absorb impact energy.

Further, since the vehicle outer flange 122 and the vehicle inner flange 123 are joined to both end portions of the web 121 in the vehicle width direction, a deformation mode when the web 121 is buckled and deformed can be maintained in a higher-order mode having a short buckling wavelength. Since the vehicle outer flange 122 and the vehicle inner flange 123 are joined to both end portions of the web 121 in the vehicle width direction, even when an impact load is concentrated locally on the lateral surface member structure 100 due to the collision of obstacle, in a process in which the impact load is transmitted from the lateral surface member structure 100 to the web 121 via the vehicle outer flange 122, the impact load can be dispersed in the front-rear direction and the impact energy can be absorbed in a wide range in the front-rear direction. Therefore, it is possible to reduce a maximum value of the local deformation of the lateral surface member structure 100 to the inside of the vehicle due to the concentrated impact load. Since the vehicle outer flange 122 and the vehicle inner flange 123 can efficiently increase a second moment of area around the Z direction of the impact absorbing member 120, the impact absorbing member 120 can efficiently resist bending deformation (bending deformation around the Z direction) in the vehicle width direction toward the inside of the vehicle. Therefore, the deformation of the impact absorbing member 120 to the inside of the vehicle can be suppressed.

Further, since the vehicle outer flange 122 and the vehicle inner flange 123 each includes the ribs 122R and 123R which are disposed so as to sandwich the web 121 from above and below and extend along the front-rear direction, the second moment of area around the Y direction and the second moment of area around the X direction can increase. Therefore, it is difficult to bend and deform around the Y direction, that is, it is difficult to bend up and down, and it is difficult to twist around the X direction. Therefore, when the impact load is applied, the impact absorbing member 120 can be compactly deformed without causing a large deformation.

As described above, the impact absorbing member 120 can efficiently absorb the impact energy and suppress the deformation to the inside of the vehicle even when the impact load acts from the vehicle width direction. Therefore, the battery case 20 accommodating the battery pack 21 can be effectively protected.

Specifically, the vehicle outer flange 122 and the vehicle inner flange 123 are made of, for example, steel. It is desirable that each of the vehicle outer flange 122 and the vehicle inner flange 123 has a tensile strength of 590 MPa or more, preferably 780 MPa or more, more preferably 980 MPa or more, from the viewpoint of restraining the deformation of the web 121.

As shown in FIG. 2, the cross section of the vehicle outer flange 122 perpendicular to the front-rear direction is a substantially C shape including a base portion 122B which extends in the up-down direction and an upper rib 122RU and a lower rib 122RD which extend to the inside of the vehicle from both upper and lower end portions of the base portion 122B. The cross-sectional shape of the vehicle outer flange 122 may be uniform along the front-rear direction.

Similarly, the cross section of the vehicle inner flange 123 perpendicular to the front-rear direction is a substantially C shape including a base portion 123B which extends in the up-down direction and an upper rib 123RU and a lower rib 123RD which extend to the outside of the vehicle from both upper and lower end portions of the base portion 123B. The cross-sectional shape of the vehicle inner flange 123 may be uniform along the front-rear direction.

In both the vehicle outer flange 122 and the vehicle inner flange 123, the web 121 is sandwiched in an inside having a substantially C-shaped cross section. That is, since the web 121 is sandwiched between the upper rib 122RU and the lower rib 122RD of the vehicle outer flange 122 and the web 121 is sandwiched between the upper rib 123RU and the lower rib 123RD of the vehicle inner flange 123, the impact absorbing member 120 It is possible to more efficiently resist the bending deformation (bending deformation around the Z direction) in the vehicle width direction toward the inside of the vehicle, and it is possible to further suppress deformation toward the inside of the vehicle from the impact absorbing member 120.

Specifically, the vehicle outer flange 122 is joined to the vehicle outer end portion 121e of the web 121 by, for example, arc welding. Specifically, the impact absorbing member 120 forms a joint portion 124 at a boundary portion between the vehicle outer flange 122 and the web 121. The joint portion 124 may be formed only at the boundary portion between the rib 122R of the vehicle outer flange 122 and the web 121, for example, by fillet welding in order to obtain high weldability, that is, from the viewpoint of reducing welding man-hours and ensuring soundness of the welded part. That is, a first vertical plane portion 121b (refer to FIG. 5) and a second vertical plane portion 121d (refer to FIG. 5) of the web 121 and the vehicle outer flange 122 do not have to be directly joined to each other.

Similarly, the vehicle inner flange 123 is joined to the vehicle inner end portion 121i of the web 121, for example, by welding. Specifically, the impact absorbing member 120 forms a joint portion 125 at a boundary portion between the vehicle inner flange 123 and the web 121.

Here, even when the web 121 has a corrugated shape without a first horizontal plane portion 121a and a second horizontal plane portion 121c shown in FIG. 5, it suffices if the vehicle outer flange 122 can be sufficiently joined to the web 121 and the vehicle inner flange 123 can be sufficiently joined to the web 121. When the web 121 includes the first horizontal plane portion 121a and the second horizontal plane portion 121c, the first horizontal plane portion 121a can be joined to the upper rib 122RU and the upper rib 123RU more easily and more firmly, and the second horizontal plane portion 121c can be joined to the lower rib 122RD and the lower rib 123RD more easily and more firmly.

The web 121 and the rib 122R or the web 121 and the rib 123R are joined to each other. Thereby, a dimensional error of a positional relationship between the web 121 and the vehicle outer flange 122 or the vehicle inner flange 123 can be absorbed. Further, after assembling the web 121 and the rib 122R or the rib 123R, they can be joined to each other. Therefore, it is easy to manufacture. Further, a sectional stress can be continuously and reliably transmitted between the web 121 and the vehicle outer flange 122 or the vehicle inner flange 123 via the rib 122R or the rib 123R.

From the viewpoint of reducing the welding man-hours, the joint portion 125 may be formed only at the boundary portion between the rib 123R of the vehicle inner flange 123 and the web 121 by, for example, fillet welding.

A vehicle inner surface of the base portion 122B of the vehicle outer flange 122 and a vehicle outer end surface of the web 121 may be in contact with each other or may be separated from each other. When there is a gap between the vehicle inner surface of the base portion 122B of the vehicle outer flange 122 and the vehicle outer end surface of the web 121, a dimensional tolerance of the web 121 in the vehicle width direction can be absorbed by the gap, and a dimension of the impact absorbing member 120 in the vehicle width direction can be easily adjusted so as to match an internal dimension of the tubular body 110 in the vehicle width direction. Similarly, a vehicle outer surface of the base portion 123B of the vehicle inner flange 123 and a vehicle inner end surface of the web 121 may be in contact with each other or may be separated from each other.

Here, as shown in FIG. 2, in the upper rib 122RU of the vehicle outer flange 122 and the upper rib 123RU of the vehicle inner flange 123, it is preferable that lower surfaces 122CU and 123CU are provided along an upper end (here, upper surface of the first horizontal plane portion 121a) of the web 121 to restrain the deformation of the web 121 in the upward direction. That is, the lower surfaces 122CU and 123CU of the upper rib 122RU and the upper rib 123RU may be parallel to the upper surface of the first horizontal plane portion 121a without any gap.

Further, it is preferable that the lower surfaces 122CU and 123CU of the upper rib 122RU of the vehicle outer flange 122 and the upper rib 123RU of the vehicle inner flange 123 are in contact with the upper surface of the first horizontal plane portion 121a.

Further, it is preferable that the lower surface 122CU of the upper rib 122RU is in contact with at least a vehicle outermost end P1 of the first horizontal plane portion 121a, and the lower surface 123CU of the upper rib 123RU is in contact with at least a vehicle innermost end P2 of the first horizontal plane portion 121a.

Similarly, in the lower rib 122RD of the vehicle outer flange 122 and the lower rib 123RD of the vehicle inner flange 123, it is preferable that upper surfaces 122CD and 123CD are provided along a lower end (here, lower surface of the second horizontal plane portion 121c) of the web 121 to restrain the deformation of the web 121 in the downward direction. That is, the upper surfaces 122CD and 123CD of the lower rib 122RD and the lower rib 123RD may be parallel to the lower surface of the second horizontal plane portion 121c without any gap.

Further, it is preferable that the upper surfaces 122CD and 123CD of the lower rib 122RD of the vehicle outer flange 122 and the lower rib 123RD of the vehicle inner flange 123 are in contact with the lower surface of the second horizontal plane portion 121c.

Further, it is preferable that the upper surface 122CD of the lower rib 122RD is in contact with at least a vehicle outermost end P3 of the second horizontal plane portion 121c, and the upper surface 123CD of the lower rib 123RD is in contact with at least a vehicle innermost end P4 of the second horizontal plane portion 121c.

As a result, the vehicle outer flange 122 and the vehicle inner flange 123 appropriately restrain the deformation of both end portions of the web 121 in the vehicle width direction, and thus, a buckling load of the web 121 can increase.

As shown in FIG. 4, the web 121 of the impact absorbing member 120 is, for example, a wave-shaped sheet that repeatedly bends up and down alternately along the front-rear direction of the vehicle body 1. The web 121 is made of steel, for example. It is desirable that the web 121 has tensile strength of 590 MPa or more, preferably 780 MPa or more, more preferably 980 MPa or more, from the viewpoint of increasing buckling strength and obtaining high energy absorption performance while suppressing deformation. When the impact absorbing member 120 has a ridge line RL, a direction of the ridge line RL is substantially parallel to the vehicle width direction. The impact absorbing member 120 has a wavy shape as shown in FIG. 5 when viewed in the vehicle width direction, that is, in a side view, and has a rectangular shape that is long in the front-rear direction and has a predetermined width when viewed in the up-down direction as shown in FIG. 6(A), that is, in a plan view. As described above, since the impact absorbing member 120 is a wave-shaped sheet that repeatedly bends up and down alternately along the front-rear direction of the vehicle body 1, there is no unevenness in the front-rear direction and the bending rigidity (second moment of area) around the X direction is high. Therefore, in an elastic region, the impact absorbing member 120 can be made difficult to bend around the X direction, and the buckling proof stress in the vehicle width direction can be enhanced. Further, even when an impact load due to a pole side collision is input to any of local areas of the lateral surface member structure 100 in the front-rear direction, as the impact absorbing member 120 in the local area is crushed and deformed, the impact absorbing member 120 in front of and behind the local area is also deformed and crushed, and thus, the impact energy can be dispersed and absorbed in the front-rear direction of the impact absorbing member 120. Therefore, even when the impact such as the pole side collision is applied to any of the local areas in the front-rear direction, large local impact energy can be efficiently absorbed by the entire impact absorbing member 120 while suppressing the deformation of the entire impact absorbing member 120. Further, since the direction of the ridge line RL is substantially parallel to the vehicle width direction along the direction of the impact load, when the impact load is applied, the impact absorbing member 120 can be buckled in a lantern buckling mode as described later, which has a high energy absorption amount.

As shown in FIG. 5, the wave shape of the web 121 of the impact absorbing member 120 has a shape that repeats bending alternately up and down at a predetermined pitch 2D (twice length D, for example, 120 mm) and a predetermined height H (distance from a center of a sheet thickness tw at an upper end portion of the impact absorbing member 120 to a center of a sheet thickness tw at a lower end portion of the impact absorbing member 120, twice amplitude, for example, 30 mm) when viewed from the vehicle width direction.

Specifically, the web 121 has the first horizontal plane portion 121a extending in the front-rear direction (extending to the right and left when viewed in the vehicle width direction) with a predetermined length. Further, the web 121 has the first vertical plane portion 121b that bends downward (for example, at an angle of about) 120° and extends diagonally at a predetermined height H (for example, 30 mm) following the first horizontal plane portion 121a. Further, the web 121 has the second horizontal plane portion 121c that bends in the front-rear direction and extends in the front-rear direction with a predetermined length, following a lower portion of the first vertical plane portion 121b. Further, the web 121 has the second vertical plane portion 121*d* that bends upward (for example, at an angle of about 120°), extends diagonally at the predetermined height H, and continues to the next horizontal plane portion, following the second horizontal plane portion 121*c*.

The first horizontal plane portion 121*a*, the first vertical plane portion 121*b*, the second horizontal plane portion 121*c*, and the second vertical plane portion 121*d* are periodically repeated in the front-rear direction to form a wave shape. The bent portion may be formed so as to draw an arc with a predetermined radius of curvature (for example, 5 mm).

Here, under a condition that the joint portion of the web 121, and the vehicle outer flange 122 and the vehicle inner flange 123 is provided at 70% or more of a length of each of the first horizontal plane portion 121*a* and the second horizontal plane portion 121*c*, within the following numerical range regarding the dimensions of the impact absorbing member 120, a sufficient absorption amount of impact absorbed energy, which will be described later, can be secured.

Here, as the above-mentioned numerical range, the pitch 2D is within the range of 60 mm or more and 180 mm or less. The height H is 20 mm or more and 60 mm or less, preferably within the range of 20 mm or more and 50 mm or less. Each of the first horizontal plane portion 121*a* and the second horizontal plane portion 121*c* is 30 mm or more and 90 mm or less. An angle formed by the first horizontal plane portion 121*a* with the first vertical plane portion 121*b* or the second vertical plane portion 121*d* coincides with an angle formed by the second horizontal plane portion 121*c* with the first vertical plane portion 121*b* or the second vertical plane portion 121*d* within in the range of a difference of up to ±2.0°, and the angle is within the range of 45° or more and 135° or less. An overall width of the impact absorbing member 120 is 120 mm or more and 180 mm or less.

The wave shape is not limited to the above. For example, under a condition that the joint portion of the web 121, and the vehicle outer flange 122 and the vehicle inner flange 123 can be secured at least 40% or more in terms of a line length ratio of the end portion of the web 121 on the vehicle outer flange 122 side and the vehicle inner flange 123 side, for example, when viewed in the vehicle width direction, the wave shape may be such that an upwardly convex arc and a downwardly convex arc are alternately repeated or may be a shape like a sine curve. The dimensions of the wave shape such as pitch 2D and height H do not have to be constant over the longitudinal direction. A D/H value and a D/tw value are set to appropriate values from the viewpoint of crushing in an appropriate buckling mode to obtain high absorbed energy.

The web 121 of the impact absorbing member 120 can be easily formed by pressing, using a wave-shaped press die, a flat sheet material having a predetermined sheet thickness tw (for example, 1.0 mm, 1.2 mm, 1.6 mm, 2.0 mm, 2.3 mm), a predetermined width B (100 mm or more and 200 mm or less depending on the dimensions of the vehicle body 1, for example, 150 mm), and a predetermined overall length L (1,500 mm or more and 3,000 mm or less depending on the dimensions of the vehicle body 1, for example, 2,000 mm), or repeating bending the flat sheet material up and down alternately. The sheet thickness tw of the web 121 is preferably 0.7 mm or more and 2.6 mm or less from the viewpoint of suppressing bending deformation around the Z direction while ensuring the amount of energy absorbed by crushing. The sheet thickness tw of the web 121 is preferably 1.2 mm or more and 2.6 mm or less. Further, the sheet thickness tw of the web 121 is preferably 1.0 mm or more and 2.3 mm or less from the viewpoint of energy absorption stability and advanced weight reduction. Further, the sheet thickness tw of the web 121 is preferably 1.2 mm or more and 2.0 mm or less from the viewpoint of further improving energy absorption stability and formability.

Further, from the viewpoint of suppressing the bending deformation around the Z direction while ensuring the amount of energy absorbed by crushing, it is preferable that the sheet thickness tw of the web 121 is equal to or less than a sheet thickness tf of each of the vehicle outer flange 122 and the vehicle inner flange 123.

In particular, under a weight-equivalent structural condition that the structures of the web 121, the vehicle outer flange 122, and the vehicle inner flange 123 are the same except for the sheet thickness, and the weights per unit length along the longitudinal direction of the impact absorbing member 120 are equal to each other, when the input conditions such as the impact load on the lateral surface member structure 100 are the same, as the sheet thickness tf of each of the vehicle outer flange 122 and the vehicle inner flange 123 becomes thicker than the sheet thickness tw of the web 121, an intrusion amount d (refer to FIG. 6(A)), which is a maximum deformation amount of the lateral surface member structure 100 into the inside of the vehicle becomes smaller.

Here, as shown in FIGS. 6(A) and 6(B), an experiment was conducted, in which in the lateral surface member structure 100 including the impact absorbing member 120, the lateral surface member structure 100 was supported by the intersecting member 200, and in a state where a columnar rigid body RB imitating an obstacle was in contact with the lateral surface of the lateral surface member structure 100, deformation including the intrusion amount d was measured when a load F was applied to the rigid body RB in the vehicle width direction from the outside of the vehicle to the inside of the vehicle.

In the impact absorbing member 120, for example, the sheet thickness tw of the steel web 121 having a tensile strength of 980 MPa is 2.0 mm, and the sheet thickness tf of each of the steel vehicle outer flange 122 and vehicle inner flange 123 having a tensile strength of 980 MPa is 3.6 mm.

As a result of the experiment, the intrusion amount d was 57 mm. Further, for example, the same experiment as above was performed when the sheet thickness tw of the web 121 was 3.1 mm and the sheet thickness tf of each of the vehicle outer flange 122 and the vehicle inner flange 123 was 1.8 mm without changing other conditions, the intrusion amount d was 91 mm.

Therefore, from the viewpoint of reducing the intrusion amount d and protecting the battery case 20, the sheet thickness tf of each of the vehicle outer flange 122 and the vehicle inner flange 123 is preferably equal to or more than the sheet thickness tw of the web 121. Further, from the viewpoint of further ensuring the rigidity and further reducing the weight, it is desirable that tf is 3.0 mm or more and 4.5 mm or less under the condition of tf≥tw. Further, from the viewpoint of further improving the energy absorption stability, it is more desirable that tf is 3.3 mm or more and 4.2 mm or less.

Further, the web 121 has a shape in which bending is alternately repeated up and down at the predetermined pitch 2D and at the predetermined height H when viewed in the vehicle width direction. Therefore, the entire impact absorbing member 120 does not generate a buckling deformation (overall buckling mode) in which the entire impact absorbing member 120 is bent around the X direction at a local area in the vehicle width direction, and can generate a bellows-shaped, paper lantern-shaped, or intestinal filling structure (boudinage)-shaped buckling deformation (lantern buckling mode). Therefore, the buckling proof stress of the impact absorbing member 120 can be efficiently used in a wide range of the cross section perpendicular to the vehicle width direction, and when the load reaches the maximum load (peak load) as in the overall buckling mode, the load is not immediately reduced, the deformation does not proceed, and the buckling deformation can be performed while maintaining a high load. Therefore, the deformation amount can be suppressed while maintaining a large amount of energy absorption. The lantern buckling mode is a buckling deformation that continuously undulates in small steps without being biased in the front-rear direction and the up-down direction along the vehicle width direction and is expanded or contracted repeatedly in the direction perpendicular to the vehicle width direction.

The vehicle outer end portion 121e of the web 121 is joined to the vehicle outer flange 122. As a result, when an impact load is input from the vehicle outer side of the tubular body 110, the impact load is not locally biased from the tubular body 110 to the vehicle outer end portion 121e of the web 121 via the vehicle outer flange 122, and the impact load can be dispersed and uniformly transmitted to the cross section perpendicular to the vehicle width direction. Therefore, the lantern buckling mode can be stably generated for the impact absorbing member 120, and high absorbed energy can be obtained. Further, when an impact load acts on the impact absorbing member 120 in the vehicle width direction, the vehicle outer flange 122 on which the compressive stress mainly acts resists the bending moment. Further, the second moment of area around the Z direction of the impact absorbing member 120 efficiently increases. Therefore, the bending deformation of the impact absorbing member 120 around the Z direction can be suppressed.

The vehicle inner end portion 121i of the web 121 is joined to the vehicle inner flange 123. As a result, when an impact load is input to the tubular body 110 from the outside of the vehicle, the load transmitted from the tubular body 110 via the vehicle outer flange 122 and the web 121 is not locally biased, and the load can be distributed and uniformly transmitted in the front-rear direction as a tensile force acting on the cross section perpendicular to the front-rear direction of the vehicle inner flange 123. Therefore, when the impact load acts on the impact absorbing member 120 in the vehicle width direction, the vehicle inner flange 123 on which the tensile stress mainly acts resists the bending moment around the Z direction. Further, the second moment of area around the Z direction of the impact absorbing member 120 is efficiently increased. Therefore, the bending deformation of the impact absorbing member 120 around the Z direction can be suppressed.

The web 121 is compressed in the up-down direction in a state of being sandwiched from above and below by the rib 122R. Similarly, the web 121 is compressed in the up-down direction in a state of being sandwiched from above and below by the rib 123R. For example, by fitting the vehicle outer end portion 121e and the vehicle inner end portion 121i of the web 121 into the vehicle outer flange 122 and the vehicle inner flange 123, the web 121 can be compressed in the up-down direction in the state of being sandwiched by the ribs 122R and 123R from above and below.

In this way, since the web 121 is compressed in the up-down direction, the web 121, the vehicle outer flange 122, and the vehicle inner flange 123 are less likely to be displaced due to friction with each other, and can be easily joined to each other. Therefore, the impact absorbing member 120 can be easily assembled. Further, since the web 121 is compressed in the up-down direction, the buckling load in the vehicle width direction can be increased. Therefore, the impact energy can be efficiently absorbed.

The web 121 may have different tensile strength on the inside of the vehicle and on the outside of the vehicle. For example, the web 121 may have a higher tensile strength on the outside of the vehicle than on the inside of the vehicle. Alternatively, the web 121 may have a higher tensile strength on the inside of the vehicle than on the outside of the vehicle.

The end portion in the front-rear direction of the impact absorbing member 120 may be joined to the end portion in the front-rear direction of the tubular body 110. As a result, after the impact absorbing member 120 is inserted into the tubular body 110, the impact absorbing member 120 can be joined to the tubular body 110. In the impact absorbing member 120, the middle portion excluding the end portion in the front-rear direction is not joined to the tubular body 110, and only the end portion in the front-rear direction of the impact absorbing member 120 may be joined to the end portion in the front-rear direction of the tubular body 110. As a result, after the impact absorbing member 120 is inserted into the tubular body 110, only the end portion of the impact absorbing member 120 may be joined to the tubular body 110, and the middle portion may not be joined. Therefore, manufacturing efficiency can increase.

The sheet thickness tfe of the vehicle outer flange 122 and the sheet thickness tfi of the vehicle inner flange 123 may be uniform in the front-rear direction. The optimum dimensions of the sheet thickness tfe of the vehicle outer flange 122 and the sheet thickness tfi of the vehicle inner flange 123 may vary depending on design conditions. Under general design conditions, when the sheet thickness tfe of the vehicle outer flange 122 and the sheet thickness tfi of the vehicle inner flange 123 are 1.3 times or more and 3.8 times or less the sheet thickness of the web 121tw, preferably 1.6 times or more and 3.0 times or less, more preferably 2.0 times or more and 2.5 times or less, it is desirable because it is found that mass efficiency of the impact absorbed energy is improved.

(Action)

Next, action when the vehicle body 1 collides with a pole-shaped obstacle such as a utility pole installed on a ground surface and an impact load (impact energy) is input to the lateral surface member structure 100 from the outside of the vehicle will be described.

Figure 6:
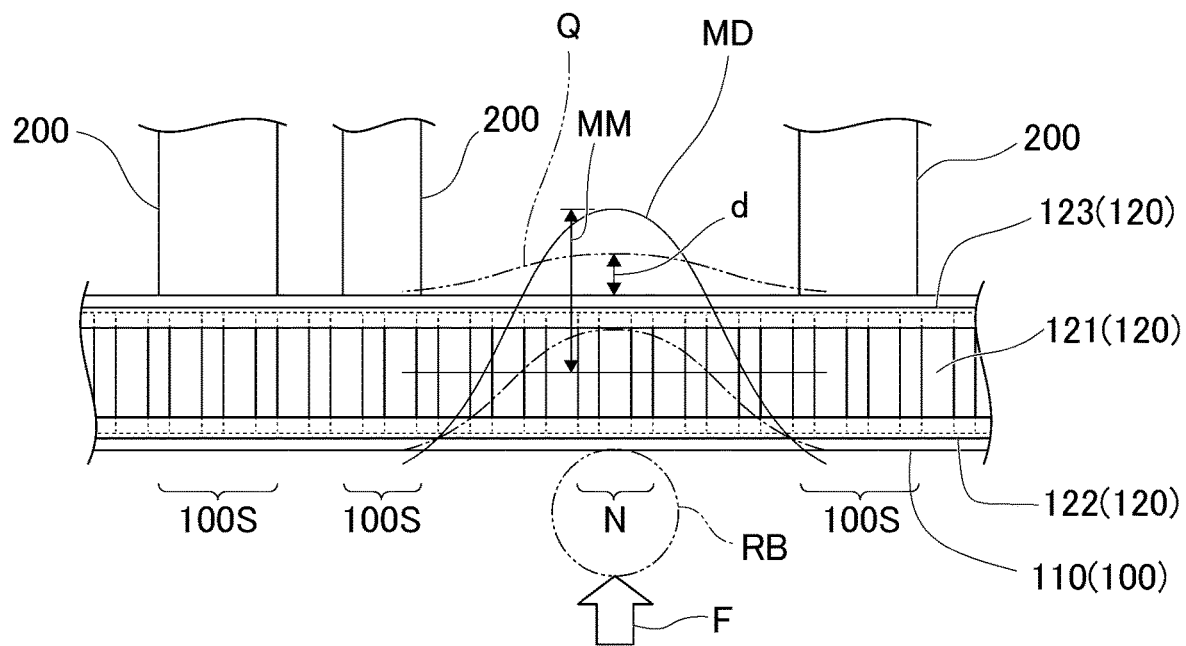
FIG. 6 is a view for describing a bending moment distribution acting on the lateral surface member structure and a deformation mode of the lateral surface member structure according to the first embodiment.
Figure 6:
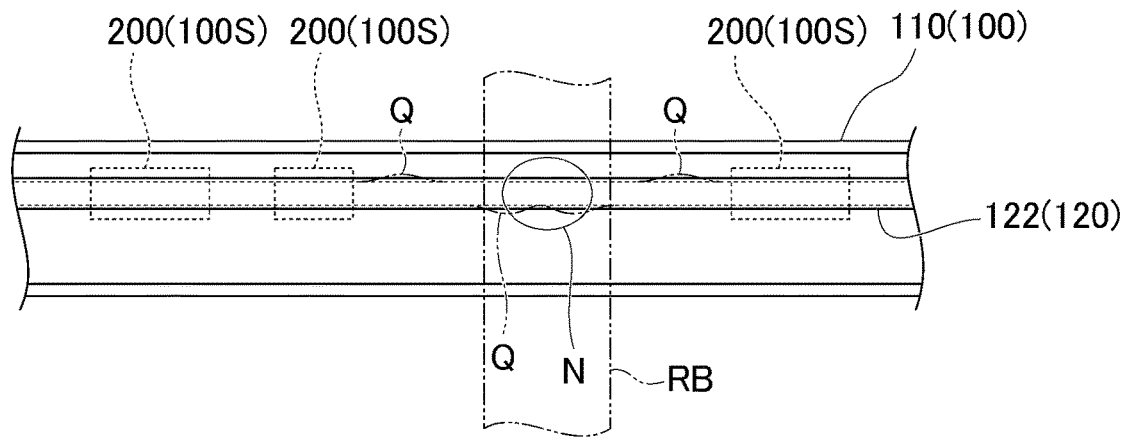

FIG. 6 is a view for describing a bending moment distribution MD acting on the lateral surface member structure 100 and a deformation mode Q of the impact absorbing member 120 according to the first embodiment, FIG. 6(A) is a plan view, and FIG. 6(B) is a side view. In FIG. 6, solid lines show the shape of the impact absorbing member 120 before the deformation. Two-dot chain lines show the shape of the deformed impact absorbing member 120 and the rigid body RB imitating an obstacle.

When the vehicle body 1 collides with a pole-shaped obstacle such as a utility pole installed on the ground surface, first, the pole-shaped obstacle comes into contact with the vehicle outside of the tubular body 110, and the tubular body 110 is pushed and locally deformed to the inside of the vehicle.

Then, following the deformation of the tubular body 110, the vehicle outer flange 122 of the impact absorbing member 120 is pushed to the inside of the vehicle, and bent and deformed around the Z direction. Then, following the deformation, the vehicle outer end portion 121e of the web 121 of the impact absorbing member 120 is deformed so as to be locally crushed. At this time, when the web 121 is deformed while resisting to a certain load, buckling occurs in the web 121 in the vehicle width direction. Here, the buckling mode is a higher-order mode, the buckling occurs uniformly in the cross section perpendicular to the vehicle width direction when viewed locally, and thus, the web 121 is further deformed in a state of being subjected to a high load.

As the deformation progresses, the buckling in the higher-order mode occurs continuously in the vehicle width direction, and the web 121 is locally crushed into a lantern-like shape that continuously undulates in small steps in the vehicle width direction. Then, a portion adjacent to the local area in the front-rear direction is also involved in the local deformation and crushed.

Here, as shown in FIG. 6, since the impact absorbing member 120 has a shape (deformation mode Q) as shown by the two-dot chain lines due to the impact energy, the impact absorbing member 120 is deformed so as to bend to the inside of the vehicle while being locally crushed. In this case, the deformation in the Z direction is suppressed by effects of the increase in the second moment of areas around the Y direction and around the Z direction and the second moment of area around the X direction in the impact absorbing member 120 due to the vehicle outer flange 122 and the vehicle inner flange 123. In this way, since the deformation in the Z direction can be suppressed, even when the impact absorbing member 120 is crushed in the vehicle width direction while effectively absorbing the impact energy, it is possible to maintain the bending rigidity around the Z direction and suppress deformation inward of the vehicle.

In this way, in the lateral surface member structure 100, by cooperating with the tubular body 110 and the impact absorbing member 120, it is possible to absorb the impact energy caused by the local pole side collision while suppressing the deformation of the lateral surface member structure 100 toward the inside of the vehicle. Therefore, the battery pack 21 disposed on the inside of the vehicle from the lateral surface member structure 100 can be effectively protected.

Here, the sheet thickness tfe of the vehicle outer flange 122 and the sheet thickness tfi of the vehicle inner flange 123 may have different portion in the front-rear direction according to the bending moment distribution MD (refer to FIG. 6) generated in the cross section of the tubular body 110 perpendicular to the front-rear direction when a load is applied to the middle portion of the tubular body 110 excluding the support portion 100S in the vehicle width direction. For example, when a load is applied to the middle portion of the tubular body 110 excluding the support portion 100S in the vehicle width direction, the sheet thickness tfe of the vehicle outer flange 122 and the sheet thickness tfi of the vehicle inner flange 123 of a portion N, in which the bending moment around the Z direction generated in the cross section perpendicular to the front-rear direction of the tubular body 110 becomes the maximum bending moment MM which is largest, may be relatively large. As a result, the maximum value of the bending deformation (deformation inward of the vehicle) of the impact absorbing member 120 around the Z direction can be efficiently suppressed. Therefore, the maximum value of the bending deformation of the lateral surface member structure 100 can be efficiently suppressed.

(Manufacturing Method)

Next, a method of manufacturing the lateral surface member structure 100 will be described.

(1) First, the tubular body 110 is prepared (tubular body preparation step). Specifically, the vehicle outer tubular body 110A and the vehicle inner tubular body 110B are combined to form a tubular body 110 extending in the front-rear direction.
(2) Next, the impact absorbing member 120 is prepared (impact absorbing member preparation step). Specifically, the vehicle outer flange 122 and the vehicle inner flange 123 are provided at both end portions of the web 121. Then, the rib 123R of the vehicle outer flange 122 and the vehicle inner flange 123 and the web 121 are welded and joined by arc welding or the like.
(3) Next, the impact absorbing member 120 is inserted into the tubular body 110 from the end portion of the tubular body, which is at least one end portion of the tubular body 110 (insertion step).
(4) Finally, the end portion of the tubular body and the impact absorbing member end portion which is at least one end portion of the impact absorbing member 120 are joined (joining process).

In this way, it is not essential to join the middle portion of the tubular body 110 and the middle portion of the impact absorbing member 120, but only by joining the end portion of the tubular body 110 and the end portion of the impact absorbing member 120, the tubular body 110 and the impact absorbing member 120 can be assembled. Therefore, by inserting the impact absorbing member 120 after the tubular body 110 is completed, the lateral surface member structure 100 can be manufactured. Therefore, the lateral surface member structure 100 having a high impact absorbed energy absorption amount and high bending rigidity can be easily manufactured.

Second Embodiment

Next, a lateral surface member structure 500 according to a second embodiment will be described. The lateral surface member structure 500 according to the second embodiment is mainly different from the lateral surface member structure 100 according to the first embodiment in that a web 521 is formed by arranging a plurality of pipes 521p having a central axis along a vehicle width direction along a front-rear direction. Hereinafter, descriptions of the parts common to the first embodiment and the second embodiment may be omitted.

Figure 7:
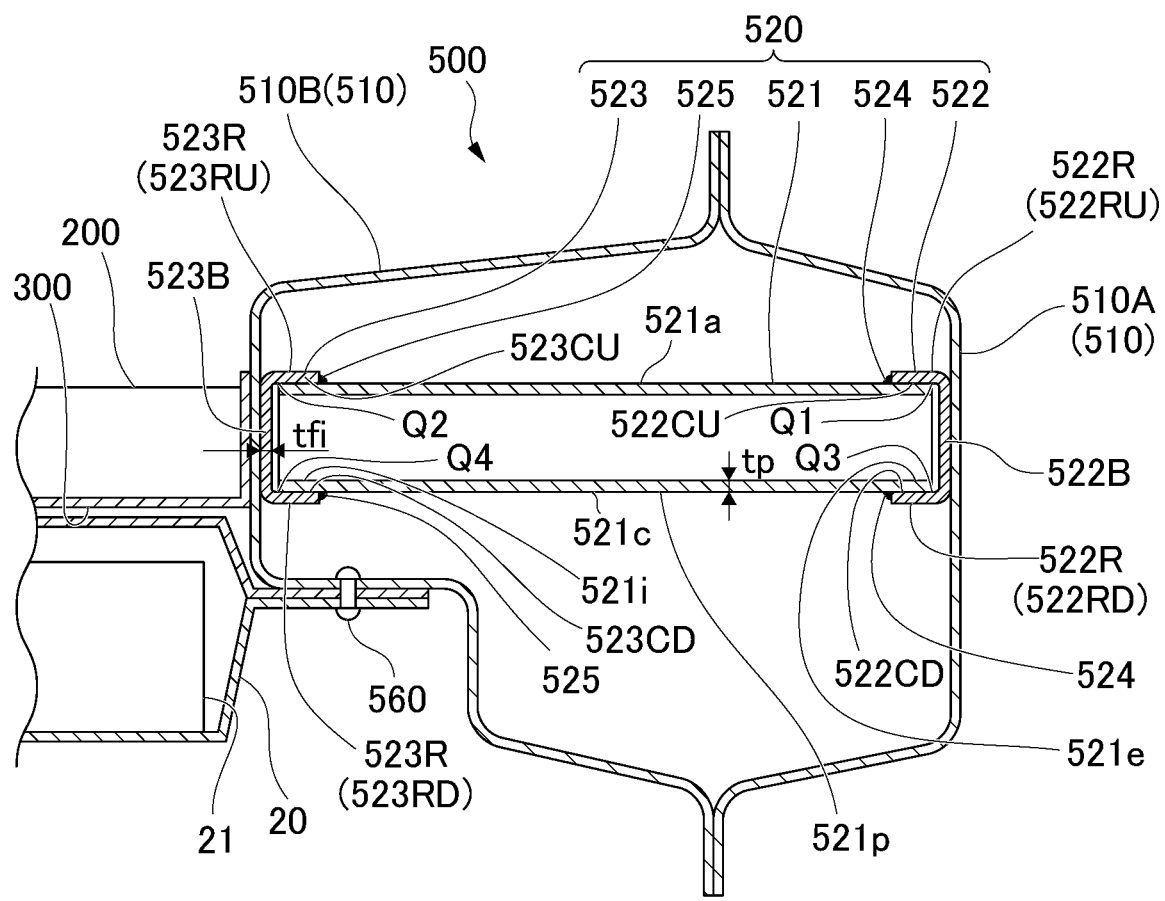
FIG. 7 is a cross-sectional view taken along line A in FIG. 1 showing a lateral surface member structure according to a second embodiment.
Figure 7:
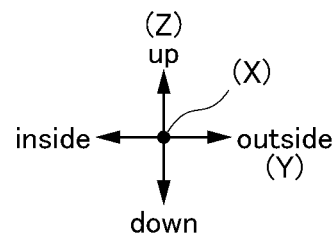
Figure 8:
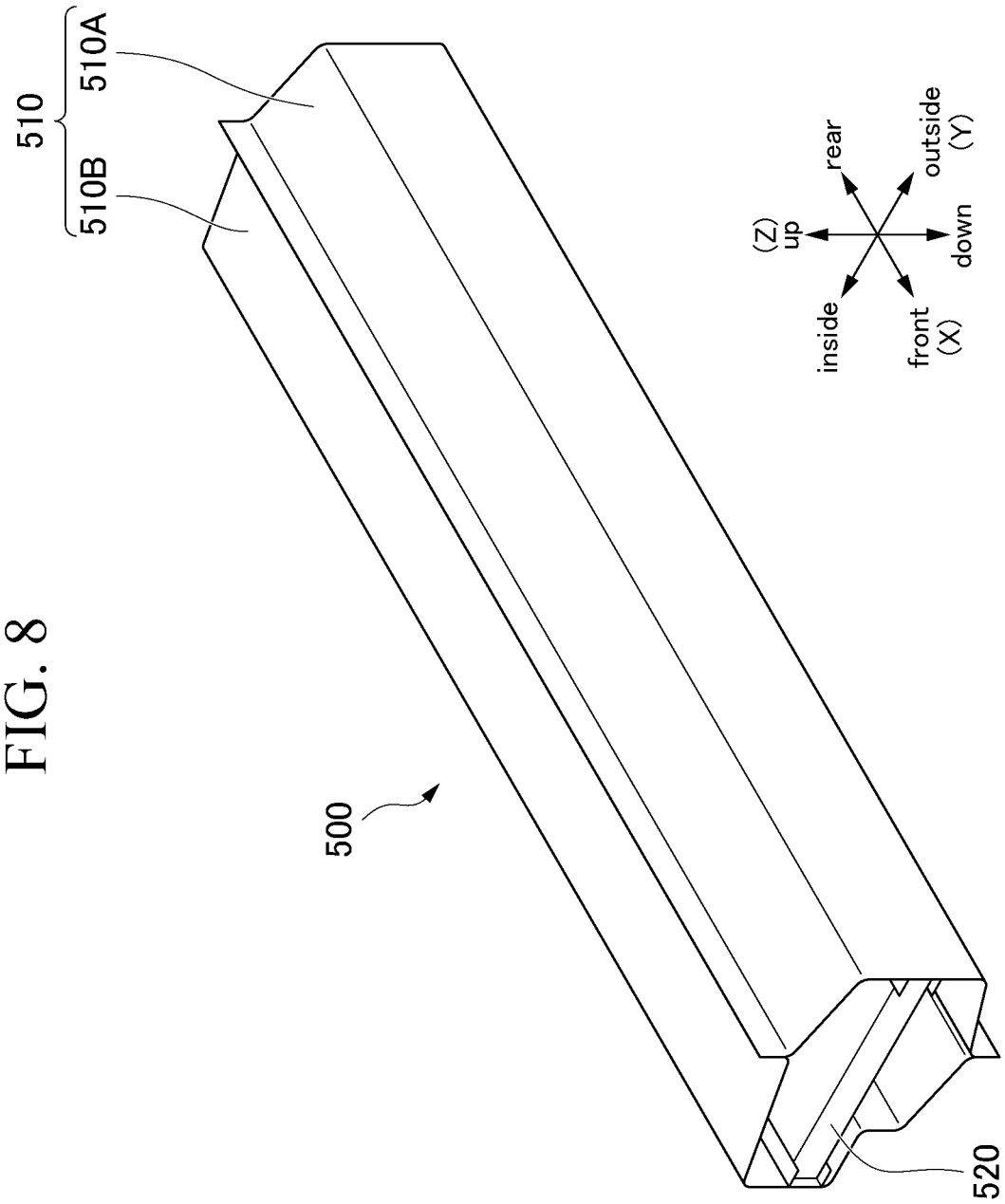
FIG. 8 is a cross-sectional perspective view showing a part of the lateral surface member structure according to the second embodiment.
Figure 9:
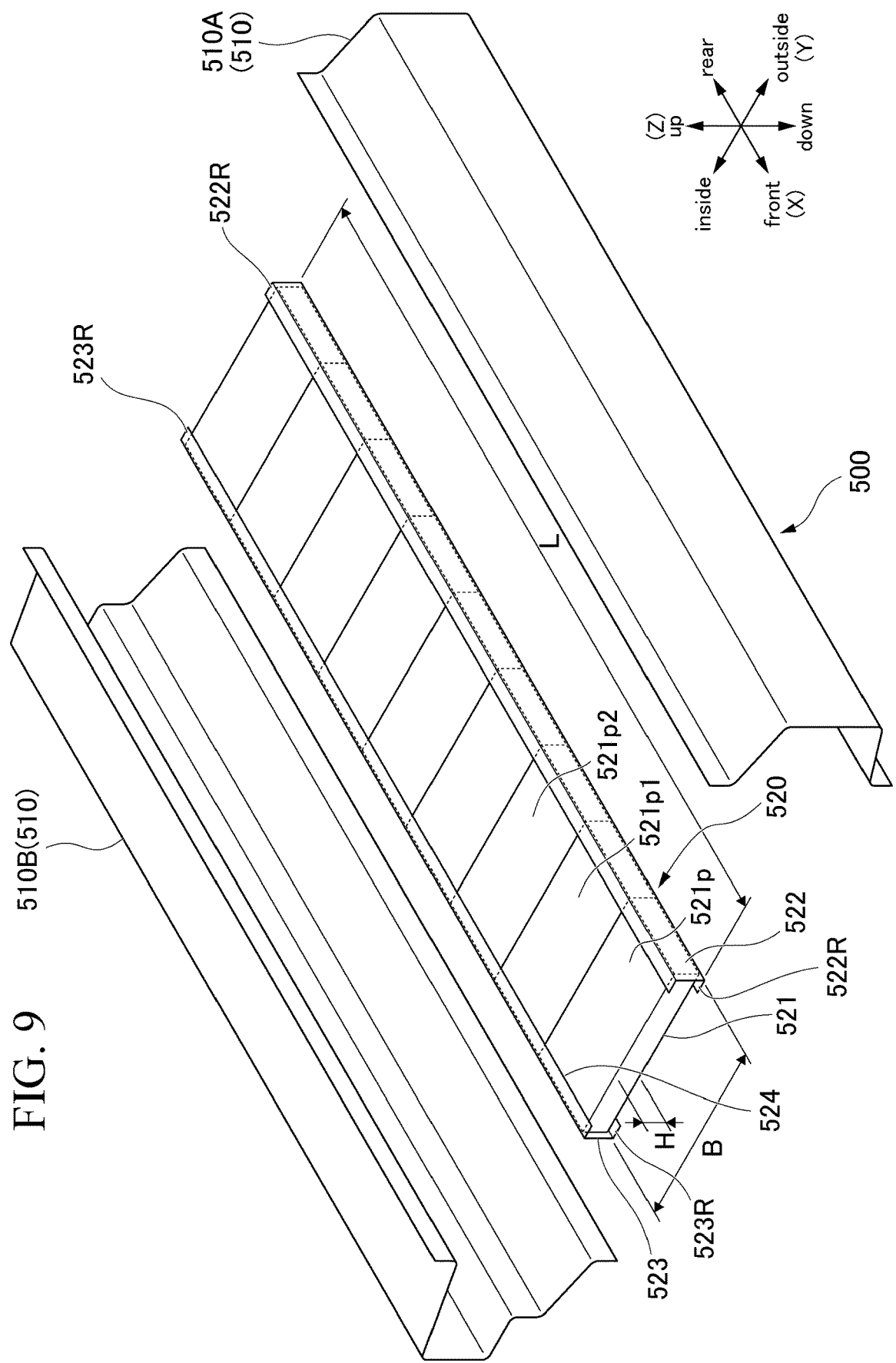
FIG. 9 is an exploded perspective view showing a part of the lateral surface member structure according to the second embodiment.
Figure 10:
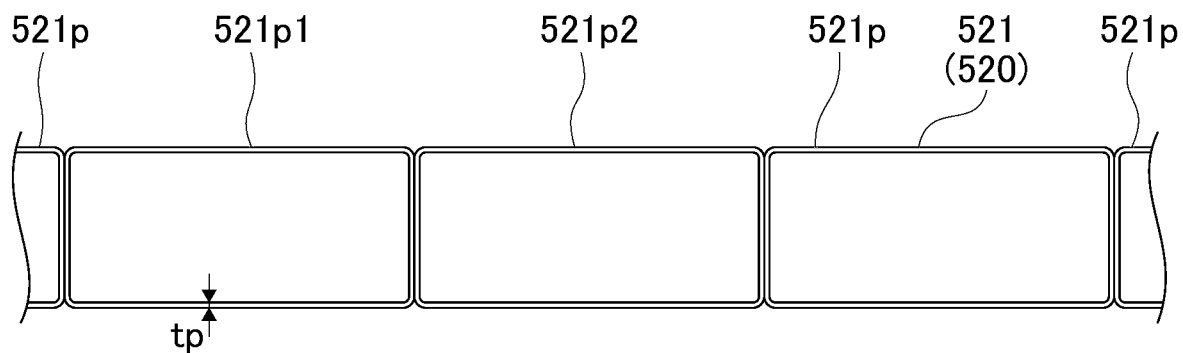
FIG. 10 is a side view showing a part of a web according to the second embodiment.

FIG. 7 is a cross-sectional view taken along line A in FIG. 1, showing the lateral surface member structure 500 according to the second embodiment. FIG. 8 is a cross-sectional perspective view showing a part of the lateral surface member structure 500 according to the second embodiment. FIG. 9 is an exploded perspective view showing a part of the lateral surface member structure 500 according to the second embodiment. FIG. 10 is a side view showing a part of the web 521 according to the second embodiment.

As shown in FIG. 7, the lateral surface member structure 500 is supported by the intersecting member 200 in the vehicle width direction (lateral direction). The intersecting member 200 supports a floor panel 300. The lateral surface member structure 500 is connected to a battery case 20 via a fastener 560.

As shown in FIGS. 8 to 10, the lateral surface member structure 500 according to the second embodiment includes a tubular body 510 extending in the front-rear direction of a vehicle body 1 and an impact absorbing member 520 disposed inside the tubular body 510.

(Tubular Body)

The tubular body 510 has a hollow elongated structure. In the tubular body 510, a longitudinal direction of the tubular body 510 is disposed along the front-rear direction of the vehicle body 1. The tubular body 510 is divided into two parts, and has a vehicle outer tubular body 510A on the outer side of the vehicle and a vehicle inner tubular body 510B on the inner side of the vehicle.

(Impact Absorbing Member)

In the impact absorbing member 520, a longitudinal direction of the impact absorbing member 520 is disposed inside the tubular body 510 along the front-rear direction of the vehicle body 1.

The impact absorbing member 520 includes a web 521 extending along the front-rear direction of the vehicle body 1 and flat in the vehicle width direction of the vehicle body 1, a vehicle outer flange 522 joined to a vehicle outer end portion 521e of the web 521 and extending along the front-rear direction, and a vehicle inner flange 523 joined to a vehicle inner end portion 521i of the web 521 and extending along the front-rear direction. The vehicle outer flange 522 and the vehicle inner flange 523 includes ribs 522R and 523R disposed so as to sandwich the web 521 from above and below and extending along the front-rear direction.

Specifically, as shown in FIG. 7, a cross section of the vehicle outer flange 522 perpendicular to the front-rear direction is a substantially C shape (groove shape) including a base portion 522B which extends in the up-down direction and an upper rib 522RU and a lower rib 522RD which extend to the inside of the vehicle from both upper and lower end portions of the base portion 522B. The cross-sectional shape of the vehicle outer flange 522 may be uniform along the front-rear direction.

Similarly, the cross section of the vehicle inner flange 523 perpendicular to the front-rear direction is a substantially C shape including a base portion 523B which extends in the up-down direction and an upper rib 523RU and a lower rib 523RD which extend to the outside of the vehicle from both upper and lower end portions of the base portion 523B. The cross-sectional shape of the vehicle inner flange 523 may be uniform along the front-rear direction.

The vehicle outer flange 522 is joined to a vehicle outer end portion 521e of the web 521, for example, by welding. Specifically, the impact absorbing member 520 forms a joint portion 524 at a boundary portion between the vehicle outer flange 522 and the web 521.

Similarly, the vehicle inner flange 523 is joined to a vehicle inner end portion 521i of the web 521, for example, by welding. Specifically, the impact absorbing member 520 forms a joint portion 525 at the boundary portion between the vehicle inner flange 523 and the web 521.

The web 521 and the rib 522R or the web 521 and the rib 523R are joined to each other. Thereby, a dimensional error of a positional relationship between the web 521 and the vehicle outer flange 522 or the vehicle inner flange 523 can be absorbed. Further, after assembling the web 521 and the rib 522R or the rib 523R, they can be joined to each other. Therefore, it is easy to manufacture. Further, a sectional stress can be continuously and reliably transmitted between the web 521 and the vehicle outer flange 522 or the vehicle inner flange 523 via the rib 522R or the rib 523R.

From the viewpoint of reducing the welding man-hours, the joint portion 525 may be formed only at the boundary portion between the rib 523R of the vehicle inner flange 523 and the web 521 by, for example, fillet welding.

A vehicle inner surface of the base portion 522B of the vehicle outer flange 522 and a vehicle outer end surface of the web 521 may be in contact with each other or may be separated from each other. When there is a gap between the vehicle inner surface of the base portion 522B of the vehicle outer flange 522 and the vehicle outer end surface of the web 521, a dimensional tolerance of the web 521 in the vehicle width direction can be absorbed by the gap, and a dimension of the impact absorbing member 520 in the vehicle width direction can be easily adjusted so as to match an internal dimension of the tubular body 510 in the vehicle width direction. Similarly, a vehicle outer surface of the base portion 523B of the vehicle inner flange 523 and a vehicle inner end surface of the web 521 may be in contact with each other or may be separated from each other.

Here, as shown in FIG. 7, in the upper rib 522RU of the vehicle outer flange 522 and the upper rib 523RU of the vehicle inner flange 523, it is preferable that the lower surfaces 522CU and 523CU are provided along an upper end (here, upper surface of the first horizontal plane portion 521a) of the web 521 to restrain the deformation of the web 521 in the upward direction. That is, the lower surfaces 522CU and 523CU of the upper rib 522RU and the upper rib 523RU may be parallel to the upper surface of the first horizontal plane portion 521a without any gap.

Further, it is preferable that the lower surfaces 522CU and 523CU of the upper rib 522RU of the vehicle outer flange 522 and the upper rib 523RU of the vehicle inner flange 523 are in contact with the upper surface of the first horizontal plane portion 521a.

Further, it is preferable that the lower surface 522CU of the upper rib 522RU is in contact with at least a vehicle outermost end Q1 of the first horizontal plane portion 521a, and the lower surface 523CU of the upper rib 523RU is in contact with at least a vehicle innermost end Q2 of the first horizontal plane portion 521a.

Similarly, in the lower rib 522RD of the vehicle outer flange 522 and the lower rib 523RD of the vehicle inner flange 523, it is preferable that upper surfaces 522CD and 523CD are provided along a lower end (here, lower surface of the second horizontal plane portion 521c) of the web 521 to restrain the deformation of the web 521 in the downward direction. That is, the upper surfaces 522CD and 523CD of the lower rib 522RD and the lower rib 523RD may be parallel to the lower surface of the second horizontal plane portion 521c without any gap.

Further, it is preferable that the upper surfaces 522CD and 523CD of the lower rib 522RD of the vehicle outer flange 522 and the lower rib 523RD of the vehicle inner flange 523 are in contact with the lower surface of the second horizontal plane portion 521c.

Further, it is preferable that the upper surface 522CD of the lower rib 522RD is in contact with at least a vehicle outermost end Q3 of the second horizontal plane portion 521c, and the upper surface 523CD of the lower rib 523RD is in contact with at least a vehicle innermost end Q4 of the second horizontal plane portion 521c.

As a result, the vehicle outer flange 522 and the vehicle inner flange 523 appropriately restrain the deformation of both end portions of the web 521 in the vehicle width direction, and thus, a buckling load of the web 521 can increase.

As shown in FIGS. 9 and 10, the web 521 of the impact absorbing member 520 is formed by arranging the plurality of pipes 521p having the central axis along the vehicle width direction in the front-rear direction.

Each pipe 521*p* has, for example, a rectangular cross section perpendicular to the central axis along the vehicle width direction. The cross section is a rectangular shape flat in the front-rear direction. Each pipe 521*p* has, for example, a sheet thickness tp of about 1 mm. Each pipe 521*p* is made of steel, for example, and has a tensile strength of 980 MPa.

As described above, since the web 521 of the impact absorbing member 520 is formed by arranging the plurality of pipes 521*p* having the central axis along the vehicle width direction along the front-rear direction, there is no unevenness in the front-rear direction and the bending rigidity (second moment of area) around the X direction is high. Therefore, in the elastic property region, the impact absorbing member 520 can be made difficult to bend around the X direction, and the buckling proof stress in the vehicle width direction can be enhanced. Further, since the central axis of the pipe 521*p* is substantially parallel to the vehicle width direction along the direction of the impact load, when the impact load is applied, the impact absorbing member 520 can be buckled in a buckling mode which has a high energy absorption amount.

The adjacent pipes 521*p* are joined to each other in a state where the flat surfaces of the pipes 521*p* are in contact with each other in the front-rear direction. That is, first pipe 521*p*1 and second pipe 521*p*2 adjacent to each other are joined to each other. As a result, even when an impact load due to a pole side collision is input to any of the local areas of the lateral surface member structure 500 in the front-rear direction, the adjacent first pipe 521*p*1 and the second pipe 521*p*2 are joined to each other. Accordingly, as a group of the pipes 521*p* in the local area is crushed and deformed, the group of the pipes 521*p* in front of and behind the local area is also deformed and crushed. Therefore, the impact energy can be dispersed and absorbed in the front-rear direction of the impact absorbing member 520. Therefore, even when the impact such as a pole side collision is applied to any of the regions in the front-rear direction, large local impact energy can be efficiently absorbed by the entire impact absorbing member 520 while suppressing the deformation of the entire impact absorbing member 520.

Other Embodiments

The form of the web in the impact absorbing member is not limited to the web 121 in the first embodiment or the web 521 in the second embodiment. The web in the impact absorbing member may be, for example, a porous body made of metal, preferably steel.

Further, in the above-mentioned first embodiment and the second embodiment, the case where the impact absorbing member 120 or the impact absorbing member 520 is used alone has been described. However, the present invention is not limited to this, and with respect to the single tubular body 110 or 510, a plurality of the impact absorbing members 120 may be used, a plurality of the impact absorbing members 520 may be used, and the plurality of impact absorbing members 120 and the plurality of impact absorbing members 520 may be used in combination. In these cases, the plurality of impact absorbing members 120 or the impact absorbing members 520 may be disposed up and down so as to be parallel to each other.

Example

Next, a result of a numerical analysis performed on the lateral surface member structure 100 of an example will be described. The lateral surface member structure 100 of the first embodiment as shown in FIGS. 1 to 6 was used as the example. Further, a lateral surface member structure that had the same mass as that of the impact absorbing member of the example, used an impact absorbing member including only web, and had the same other structures as those of the example was used as a comparative example. Numerical analysis was performed on structural models for the example and the comparative example.

Figure 11:
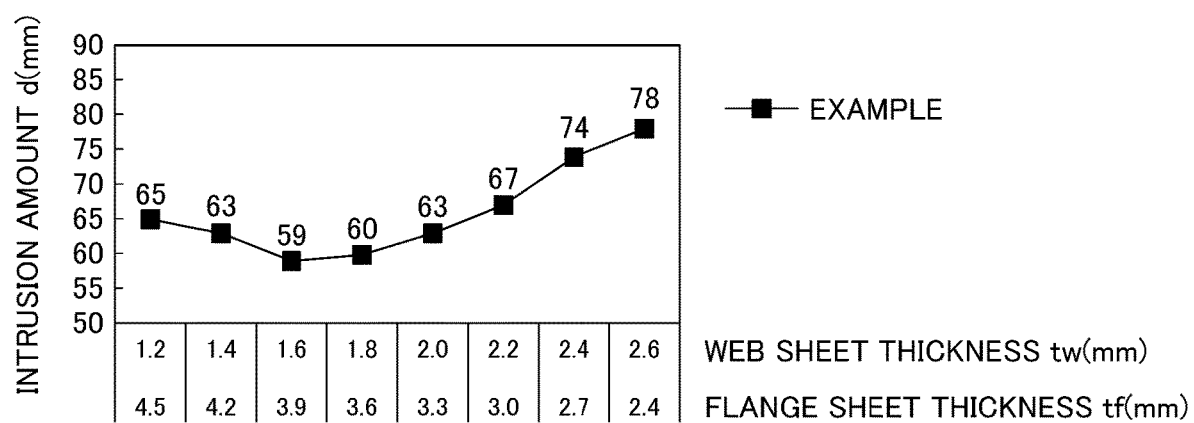
FIG. 11 is a diagram showing results of a numerical analysis of an intrusion amount.

FIG. 11 is a diagram showing a numerical analysis result of the intrusion amount d.

Specifically, as the example, as shown in FIGS. 1 to 6, a structural model of the lateral surface member structure 100 including the impact absorbing member 120, in which the web 121 having the sheet thickness tw and the vehicle outer flange 122 and the vehicle inner flange 123 each having the sheet thickness tf were assembled, was prepared.

The material of each of the web 121, the vehicle outer flange 122, and the vehicle inner flange 123 are all made of steel having a tensile strength of 980 MPa.

The sheet thickness tfe of the vehicle outer flange 122 and the sheet thickness tfi of the vehicle inner flange 123 were set to the same sheet thickness tf. The height H of the web 121 was set to 27 mm.

The overall width of the impact absorbing member 120 was set to 137 mm.

The upper surfaces of all the first horizontal plane portions 121*a* in the web 121 were fillet welded to the vehicle inner end surface of the upper rib 122RU of the vehicle outer flange 122 and the vehicle outer end surface of the upper rib 123RU of the vehicle inner flange 123.

The lower surfaces of all the second horizontal plane portions 121*c* in the web 121 were fillet welded to the vehicle inner end surface of the lower rib 122RD of the vehicle outer flange 122 and the vehicle outer end surface of the lower rib 123RD of the vehicle inner flange 123. A plurality of structural models including impact absorbing members 120 having different combinations of the sheet thickness tw and the sheet thickness tf as shown in FIG. 11 were prepared. The sheet thickness tw of the web 121 and the sheet thicknesses tf of the flanges 122 and 123 were combined so that the mass of the impact absorbing member 120 in which the vehicle outer flange 122, the vehicle inner flange 123, and the web 121 were combined was the same in all structural models.

The combination (tw, tf) of the sheet thickness tw of the web 121 and the sheet thicknesses tf of the flanges 122 and 123 was set to (1.2 mm, 4.5 mm), (1.4 mm, 4.2 mm), (1.6 mm, 3.9 mm), (1.8 mm, 3.6 mm), (2.0 mm, 3.3 mm), (2.2 mm, 3.0 mm), (2.4 mm, 2.7 mm), (2.6 mm, 2.4 mm).

Specifically, as the comparative example, a structural model of the lateral surface member structure including the impact absorbing member having the same structure as that of the example except that the vehicle inner flange 123 and the vehicle outer flange 122 were excluded and the web having the same overall width as that of the impact absorbing member 120 of the example was provided was prepared. That is, the shape of the impact absorbing member of the comparative example when viewed in the vehicle width direction is the same as the shape of the web 121 of the example. Then, a plurality of the comparative examples having different web sheet thicknesses tw were prepared, and the sheet thickness tw of the web of each comparative example was set to 1.2 mm, 1.4 mm, 1.6 mm, 1.8 mm, 2.0 mm, 2.2 mm, 2.4 mm, and 2.6 mm corresponding to the example.

Then, as shown FIGS. 6(A) and 6(B), the numerical analysis was conducted, in which in the lateral surface member structure 100 of the example, in a state where the lateral surface member structure 100 was supported by the intersecting member 200 and in a state where a columnar rigid body RB imitating an obstacle was in contact with the lateral surface of the lateral surface member structure 100, reaction such as deformation including the intrusion amount d was calculated when a load F was applied to the rigid body RB in the vehicle width direction from the outside of the vehicle to the inside of the vehicle. Similarly, the numerical analysis was performed on the lateral surface member structure of the comparative example.

As a result, as shown in FIG. 11, the intrusion amount d in the example when (tw, tf) was (1.2 mm, 4.5 mm) was 65 mm. Similarly, the intrusion amount d was 63 mm when (tw, tf) was (1.4 mm, 4.2 mm), 59 mm when (tw, tf) was (1.6 mm, 3.9 mm), 60 mm when (tw, tf) was (1.8 mm, 3.6 mm), 67 mm when (tw, tf) was (2.0 mm, 3.3 mm), 63 mm when (tw, tf) was (2.2 mm, 3.0 mm), 74 mm when (tw, tf) was (2.4 mm, 2.7 mm), and 78 mm when (tw, tf) was (2.6 mm, 2.4 mm).

Meanwhile, the intrusion amount d in the comparative example was more than 90 mm in any of the sheet thicknesses tw of the web corresponding to the example, and was larger than the intrusion amount d in the example.

As described above, the lateral surface member structure 100 of the example has the vehicle outer flange joined to the vehicle outer end portion of the web 121 and the vehicle inner flange joined to the vehicle inner end portion of the web 121, the intrusion amount d can be surely reduced. Moreover, since the vehicle outer flange 122 and the vehicle inner flange 123 in the lateral surface member structure 100 of the example have ribs 122R and 123R disposed so as to sandwich the web 121 from above and below, the intrusion amount d can be surely reduced largely.

INDUSTRIAL APPLICABILITY

The lateral surface member structure of the vehicle body according to one aspect of the embodiment is suitably applicable to a side sill, which is a member located under the door of the lateral opening portion, among the frames including the frame of the vehicle body driven by a battery, such as an electric vehicle. The object to be protected by the lateral surface member structure of the vehicle body according to one aspect of the embodiment may be other than the battery pack as long as it is disposed inside the vehicle from the lateral surface member structure.

BRIEF DESCRIPTION OF THE REFERENCE SYMBOLS

1: vehicle body
2D: pitch
10: frame
20: battery case
21: battery pack
100,500: lateral surface member structure
100S: support portion
110,510: tubular body
110A, 510A: vehicle outer tubular body
110B, 510B: vehicle inner tubular body
120,520: impact absorbing member
121,521: web
121a: first horizontal plane portion
121b: first vertical plane portion
121c: second horizontal plane portion
121d: second vertical plane portion
121e, 521e: vehicle outer end portion
121i, 521i: vehicle inner end portion
122,522: vehicle outer flange
122B, 522B: base portion
122R, 522R: rib
122RD, 522RD: lower rib
122RU, 522RU: upper rib
123,523: vehicle inner flange
123B, 523B: base portion
123R, 523R: rib
123RD, 523RD: lower rib
123RU, 523RU: upper rib
124: joint portion
125: joint portion
160,560: fastener
200: intersecting member
300: floor panel
521p: pipe
521p1: first pipe
521p2: second pipe
524, 525: joint portion
B: width
L: overall length
MD: moment distribution
MM: maximum bending moment
N: portion
Q: deformation mode
RL: ridge line
t, tf, tfe, tfi, tp, tw: sheet thickness
d: intrusion amount
RB: rigid body
F: load
P1, P2, P3, P4: end

The invention claimed is:

1. A lateral surface member structure of a vehicle body, comprising:
a tubular body extending in a front-rear direction of the vehicle body; and
an impact absorbing member disposed inside the tubular body,
wherein the impact absorbing member includes
a web extending along the front-rear direction and flat in a vehicle width direction,
a vehicle outer flange joined to a vehicle outer end portion of the web and extending along the front-rear direction, and
a vehicle inner flange joined to a vehicle inner end portion of the web and extending along the front-rear direction, and
the vehicle outer flange and the vehicle inner flange include a rib disposed so as to sandwich the web from above and below and extending along the front-rear direction.

2. The lateral surface member structure of a vehicle body according to claim 1,
wherein the web is compressed in an up-down direction in a state of being sandwiched from above and below by the rib.

3. The lateral surface member structure of a vehicle body according to claim 1,
wherein a sheet thickness of the web is equal to or less than a sheet thickness of the vehicle outer flange and a sheet thickness of the vehicle inner flange.

4. The lateral surface member structure of a vehicle body according to claim 1,
wherein the rib and the web are joined to each other.

5. The lateral surface member structure of a vehicle body according to claim 1, wherein the web is a wavy sheet that is repeatedly bent up and down alternately along the front-rear direction.

6. The lateral surface member structure of a vehicle body according to claim 1,
wherein the web is a metal porous body.

7. The lateral surface member structure of a vehicle body according to claim 1,
wherein the web is formed by arranging a plurality of pipes having a central axis along the vehicle width direction along the front-rear direction.

8. The lateral surface member structure of a vehicle body according to claim 7,
wherein a first pipe and a second pipe adjacent to each other in the plurality of pipes are joined to each other.

9. The lateral surface member structure of a vehicle body according to claim 1,
wherein the tubular body has a support portion that is supported in the vehicle width direction by an intersecting member which intersects in the vehicle width direction, and
wherein a sheet thickness of the vehicle outer flange and a sheet thickness of the vehicle inner flange have different portion in the front-rear direction according to a bending moment distribution generated in a cross section of the tubular body perpendicular to the front-rear direction when a load is applied to a middle portion of the tubular body excluding the support portion in the vehicle width direction.

10. The lateral surface member structure of a vehicle body according to claim 2,
wherein a sheet thickness of the web is equal to or less than a sheet thickness of the vehicle outer flange and a sheet thickness of the vehicle inner flange.

11. The lateral surface member structure of a vehicle body according to claim 2,
wherein the rib and the web are joined to each other.

12. The lateral surface member structure of a vehicle body according to claim 2,
wherein the web is a wavy sheet that is repeatedly bent up and down alternately along the front-rear direction.

13. The lateral surface member structure of a vehicle body according to claim 2,
wherein the web is a metal porous body.

14. The lateral surface member structure of a vehicle body according to claim 2,
wherein the web is formed by arranging a plurality of pipes having a central axis along the vehicle width direction along the front-rear direction.

15. The lateral surface member structure of a vehicle body according to claim 14,
wherein a first pipe and a second pipe adjacent to each other in the plurality of pipes are joined to each other.

16. The lateral surface member structure of a vehicle body according to claim 2,
wherein the tubular body has a support portion that is supported in the vehicle width direction by an intersecting member which intersects in the vehicle width direction, and
wherein a sheet thickness of the vehicle outer flange and a sheet thickness of the vehicle inner flange have different portion in the front-rear direction according to a bending moment distribution generated in a cross section of the tubular body perpendicular to the front-rear direction when a load is applied to a middle portion of the tubular body excluding the support portion in the vehicle width direction.

* * * * *